(12) United States Patent
Gutty et al.

(10) Patent No.: US 8,576,403 B2
(45) Date of Patent: Nov. 5, 2013

(54) LASER GYRO HAVING A SOLID-STATE AMPLIFYING MEDIUM AND AN OPTICAL RING CAVITY

(75) Inventors: François Gutty, Palaiseau (FR); Gilles Feugnet, Palaiseau (FR); Sylvain Schwartz, Saint-Remy les Chevreuse (FR)

(73) Assignee: Thales, Neuilly sur Seine (FR)

( * ) Notice: Subject to any disclaimer, the term of this patent is extended or adjusted under 35 U.S.C. 154(b) by 249 days.

(21) Appl. No.: 13/126,437

(22) PCT Filed: Oct. 26, 2009

(86) PCT No.: PCT/EP2009/064043
§ 371 (c)(1),
(2), (4) Date: Jun. 13, 2011

(87) PCT Pub. No.: WO2010/049372
PCT Pub. Date: May 6, 2010

(65) Prior Publication Data
US 2011/0235047 A1    Sep. 29, 2011

(30) Foreign Application Priority Data
Oct. 28, 2008 (FR) ...................................... 08 05984

(51) Int. Cl.
*G01C 19/66* (2006.01)
(52) U.S. Cl.
USPC .......................................................... 356/470

(58) Field of Classification Search
USPC .................................. 356/470, 459, 468, 469
See application file for complete search history.

(56) References Cited

U.S. PATENT DOCUMENTS

| | | | |
|---|---|---|---|
| 3,102,953 A * | 9/1963 | Wallace | 378/1 |
| 4,525,843 A | 6/1985 | Diels | |
| 4,536,087 A | 8/1985 | Shernoff | |
| 4,807,999 A * | 2/1989 | Soo Hoo | 356/470 |
| 4,815,852 A * | 3/1989 | Russell | 356/470 |
| 5,367,377 A | 11/1994 | Rahn | |
| 6,650,682 B1 * | 11/2003 | Diels et al. | 372/94 |

FOREIGN PATENT DOCUMENTS

| | | |
|---|---|---|
| EP | 0 287 188 A2 | 10/1988 |
| FR | 2 547 409 A1 | 12/1984 |

* cited by examiner

*Primary Examiner* — Gregory J Toatley
*Assistant Examiner* — Rufus Phillips
(74) *Attorney, Agent, or Firm* — Baker & Hostetler LLP

(57) ABSTRACT

A laser gyro having a solid-state amplifying medium and an optical ring cavity includes an assembly encompassing the optical cavity and able to experience an oscillating rotational motion, as well as at least one external optical device for longitudinal injection of energy into the solid-state amplifying medium. The laser gyro also includes a fixing assembly adapted for translationally and rotationally binding said assembly encompassing the optical cavity and said external optical device for longitudinal injection of energy.

7 Claims, 2 Drawing Sheets

LASER GYRO HAVING A SOLID-STATE AMPLIFYING MEDIUM AND AN OPTICAL RING CAVITY

CROSS-REFERENCE TO RELATED APPLICATIONS

This application is a National Stage of International patent application PCT/EP2009/064043, filed on Oct. 26, 2009, which claims priority to foreign French patent application No. FR 0805984, filed on Oct. 28, 2008, the disclosures of which are incorporated by reference in their entirety.

FIELD OF THE INVENTION

The invention pertains to a laser gyro comprising a solid-state amplifying element.

BACKGROUND

A gyrometer is a motion sensor which makes it possible to measure the rotation rate of the reference frame of the sensor with respect to a Galilean reference frame, about one or more axes.

A laser gyrometer, or laser gyro, is a bidirectional ring laser which makes it possible to measure an angular rate (or a relative angular position by integration over time). It consists of an optical cavity composed of several mirrors assembled on a block in which paths are drilled to provide an optical cavity. An amplifying medium is inserted into the optical path of the cavity and an excitation system must provide it energy making it possible to generate the laser gain. The elements from which the laser cavity is composed are chosen so as to allow bidirectional operation: the laser cavity must be able to simultaneously sustain two waves which propagate in opposite directions (so-called counter-rotating waves).

Laser gyros are generally used for the measurement of rotation rates or angular positions. This type of equipment is notably employed for aeronautical applications.

The operating principle of a laser gyro is based on the Sagnac effect in a ring laser cavity to which a rotational motion is imparted. When the cavity is stationary, the two counter-rotating waves exhibit the same optical frequency. In the presence of a rotational motion in the plane of the optical cavity, the Sagnac effect induces a difference of frequency $\Omega$ between the two counter-rotating optical waves. A fraction of the energy of each wave is extracted from the cavity. A recombination device causes the two extracted beams to interfere so as to form interference fringes which are observed with the aid of one or more photo-detectors. In an ideal laser gyrometer, the frequency of the fringes in front of the photo-detector is proportional to the rotation rate impressed on the cavity and their direction of travel depends on the direction of rotation.

The majority of laser gyrometers, also called laser gyros, use a gaseous amplifying medium which is customarily a mixture of helium and neon. The excitation of the gaseous amplifying medium is then generally performed by creating a plasma in the gas, for example by generating a discharge between two electrodes which are mechanically bound securely to the cavity. However, the gaseous nature of the amplifying medium remains a source of technical complications during the production of the laser gyro, notably because of the high gas purity required. Furthermore, it induces sources of aging of the laser, with sensitivity to leak-tightness of the cavity, degradation of certain electrodes with operation.

It is possible to produce a laser gyro with solid-state amplifying medium, in which the gaseous amplifying medium is replaced with a solid element, for example, by employing Neodymium ions in a YAG (Yttrium-Aluminum-Garnet) matrix, commonly denoted by Nd:YAG, it is possible to produce a solid-state laser gyro operating in the near infra-red. A crystalline matrix or a glass doped with ions belonging to the class of the rare earths (Erbium, Ytterbium, etc.) or else a semi-conducting material can be used as amplifying medium. All the problems inherent with the gaseous state of the amplifying medium are thus obviated. Since the crystalline or glass matrices commonly employed are very bad electrical conductors, only optical pumping can excite the amplifying medium. An optical beam of appropriate wavelength must be injected into the useful volume of the solid amplifying medium so as to induce the population inversion of the desired atomic transition which makes it possible to induce the optical gain. This pumping can currently be carried out effectively with the aid of laser diode or fibered laser diodes.

Solid-state laser gyros are generally used to measure rotation rates or angular positions. This type of equipment is notably employed for aeronautical applications.

To optimize the optical pumping, it is possible to perform a longitudinal pumping, or, stated otherwise, to inject energy into the axis of the resonant beam, through a mirror of the laser cavity. Additional internal devices can optionally be employed to stabilize a counter-rotating wave manner of operation. A measurement of the rotation rate of the cavity can then be performed by observing the interferences between the two counter-rotating resonant waves.

The longitudinal configuration of the optical pumping makes it necessary to superimpose the injected beam on the optically stable beam in the cavity with a precision of less than twenty micrometers. Such precision is customarily obtained by securely binding the optical components of the injection to an independent support furnished with elements for adjusting position and tilt. The motion of this support is not tied to that of the optical cavity.

In order to compensate for the limits inherent in laser gyros with a gaseous-state amplifying medium, for low rotation rates, typically rotation rates of less than a few tenths or indeed a few hundredths of a degree per second, it is generally chosen to permanently subject the cavity to an oscillating rotational motion, by mechanical activation, at a frequency of the order of 100 Hz to 1 kHz. This mode of implementation allows laser gyros with gaseous-state amplifying medium to operate correctly in this low rotation rate range termed the blind zone which is due to backscattering from the mirrors. The excitation device, generally consisting of two electrodes between which a large difference of electrical voltage causes an ionization a gas, is bound securely to the block and it remains entrained in the activation of the cavity.

A laser gyrometer with solid-state amplifying medium, for example a Neodymium-doped YAG matrix, exhibits the same blind zone limit, which may be increased on account of an additional coupling of the counter-rotating waves in the solid-state amplifying medium, which generally has a so-called homogeneously broadened gain. Transposing such a mode of implementation, i.e. mechanical activation of the cavity, to a solid-state laser gyro poses a problem, since in this instance, the injection optics is external to the cavity which experiences an oscillating rotational motion that temporally modifies the position of the amplifying medium with respect to the pumping beam, thereby causing modulations of the intensity emitted by the cavity that may give rise to severe malfunctioning of the laser gyro.

SUMMARY OF THE INVENTION

An aim of the invention is to alleviate the various problems cited above.

There is proposed, according to one aspect of the invention, a laser gyro having a solid-state amplifying medium and an optical ring cavity, comprising an assembly encompassing the optical cavity and able to experience an oscillating rotational motion, as well as at least one external optical device for longitudinal injection of energy into the solid-state amplifying medium. The laser gyro with solid-state amplifying medium comprises a fixing assembly adapted for translationally and rotationally binding said assembly encompassing the optical cavity and said external optical device for longitudinal injection of energy.

It is thus possible to have a laser gyro with solid-state amplifying medium and ring optical cavity, capable of performing measurements of improved precision, even for low rates of rotation of the gyrometer.

In one embodiment:
said optical cavity comprises several reflecting mirrors and at least one partially reflecting mirror; and
said fixing assembly is designed in such a way that the part delivering energy of an external optical device for longitudinal injection of energy is situated at a minimum distance from the corresponding partially reflecting mirror depending on the optical and mechanical constraints of the laser gyro and that the external optical device for longitudinal injection of energy does not become maladjusted during said oscillating rotational motion.

The invention allows laser gyros with a solid-state amplifying element to be able to operate correctly in a zone termed the blind zone due to backscattering from the mirrors.

For example, at least one external optical device for longitudinal injection of energy comprises an energy source, a spherical mirror translationally tied with said fixing assembly, and a convergent biconvex lens disposed between said energy source and said spherical mirror.

Such an embodiment makes it possible to minimize the number of elements of the optical injection device.

For example, at least one external optical device for longitudinal injection of energy comprises an energy source, a spherical mirror translationally tied with said fixing assembly, a first concave planar or convex planar lens disposed between said energy source and said spherical mirror, and a second concave planar or convex planar lens disposed between said spherical mirror and the corresponding partially reflecting mirror.

Employing lenses exhibiting a planar surface that can be employed as a support surface when mounting the device increases precision and reproducibility in the assembly, and makes it possible to reduce the amplitude of the adjustment required subsequently in the positioning of the focusing point. Employing several lenses can also make it possible to reduce the geometric aberrations at the focusing point.

In one embodiment, the portion of the fixing assembly serving as support for said spherical mirror is tilted by substantially 45° with respect to the incident energy beam and is tilted by substantially 45° with respect to the energy injection reflected beam.

Thus, it is possible to use a geometrical configuration of the injection device that reduces its inertia and facilitates its activation with the cavity.

According to one embodiment, the radius of curvature of said spherical mirror lies between about 0.5 m and 4 m.

Thus, by translating the spherical mirror on its bearing plane, the injection device may be adjusted with the required precision.

In one embodiment, the fixing assembly comprises means for fixing the spherical mirror so as to maintain the position of the spherical mirror on the fixing assembly after adjustment of the energy injection.

For example, said fixing means comprise a rear support or glue.

Thus the energy injection is not modified during the oscillating rotational motion.

In one embodiment, the laser gyro comprises two external optical devices for longitudinal injection of energy disposed substantially symmetrically with respect to the solid-state amplifying medium.

Such an embodiment makes it possible to render the gain in the amplifying medium homogeneous and to reduce the sources of false-zeros that may originate from a non-symmetry of the active volume in the amplifying medium.

BRIEF DESCRIPTION OF THE INVENTION

The invention will be better understood on studying a few embodiments described by way of wholly non-limiting examples and illustrated by the appended drawings in which.

In the various figures, the elements having identical references are identical.

DETAILED DESCRIPTION

Figure 1:
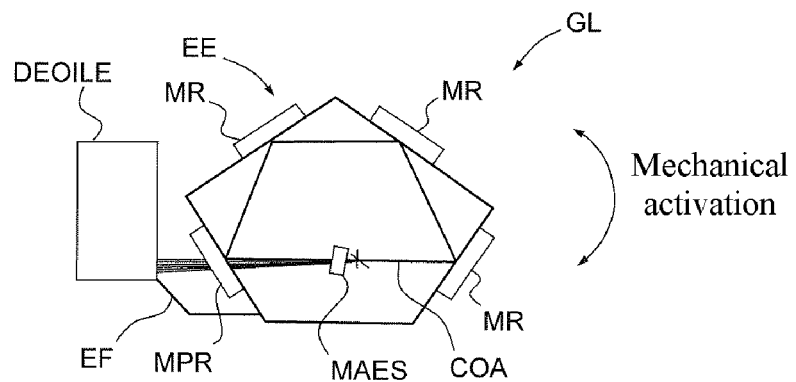
FIG. 1 is a schematic diagram of a laser gyro according to one aspect of the invention.

As illustrated in FIG. 1, a laser gyro GL having a solid-state amplifying medium MAES and a ring optical cavity COA comprises an assembly EE encompassing the optical cavity COA and able to experience an oscillating rotational motion. The device for setting the assembly EE into oscillating rotational motion is not represented. In a conventional manner, this device for setting the assembly EE into oscillating rotational motion produces, by mechanical activation, an oscillation of a frequency of 100 Hz to 1 kHz, for a maximum angular rate that may reach one, or indeed several hundred degrees per second.

The laser gyro GL comprises, furthermore, at least one external optical device for longitudinal injection of energy DEOILE into the solid-state amplifying medium MAES. The laser gyro GL also comprises a fixing assembly EF adapted for translationally and rotationally binding the assembly EE encompassing the optical cavity COA and the external optical device for longitudinal injection of energy.

The ring optical cavity COA comprises several reflecting mirrors MR, in this instance three, and a partially reflecting mirror MPR or dichroic mirror both reflecting the laser waves generated inside the optical cavity and transmitting, at least partially, the longitudinal injection of external energy at another wavelength to the solid-state amplifying medium MAES.

The fixing assembly EF is designed in such a way that the part delivering energy of an external optical device for longitudinal injection of energy DEOILE is located at a minimum distance from the partially reflecting mirror MPR depending on the optical and mechanical constraints of the laser gyro, and that the external optical device for longitudinal injection of energy DEOILE does not become maladjusted during said oscillating rotational motion.

Figure 2:
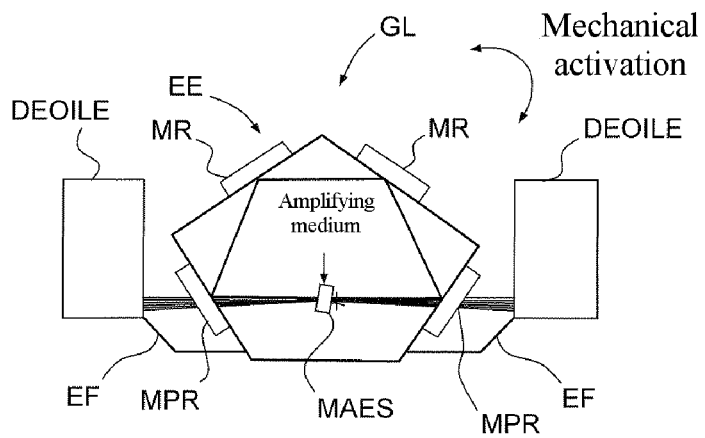
FIG. 2 is a schematic diagram of a laser gyro, according to another aspect of the invention.

In FIG. 2, as a variant, a laser gyro similar to that of FIG. 1 comprises two external optical devices for longitudinal injection of energy DEOILE disposed substantially symmetrically with respect to the solid-state amplifying medium MAES. Each external optical device for longitudinal injection of energy DEOILE is linked directly, by a respective fixing assembly EF adapted for translationally and rotationally binding the assembly EE encompassing the optical cavity COA and the corresponding external optical device for longitudinal injection of energy DEOILE.

Figure 3:
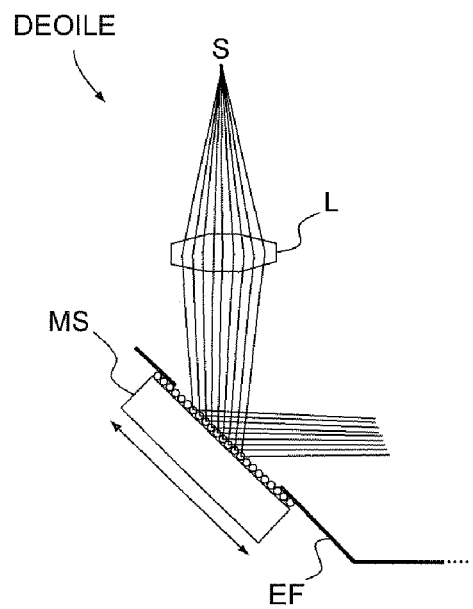
FIG. 3 is a schematic diagram of an external optical device for longitudinal injection of energy of a laser gyro according to FIG. 1 or 2.
Figure 4:
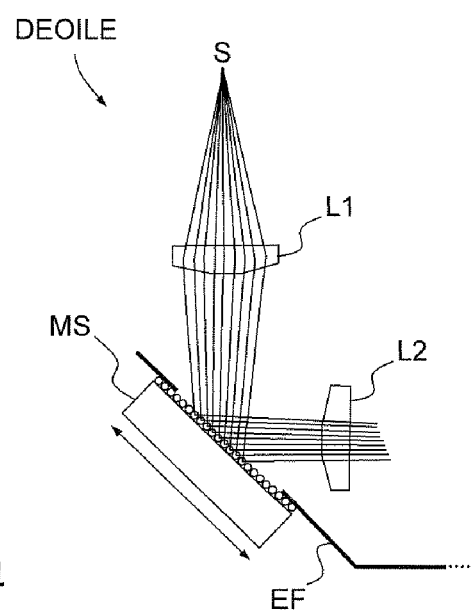
FIG. 4 is a schematic diagram of another external optical device for longitudinal injection of energy of a laser gyro according to FIG. 1 or 2.

FIGS. 3 and 4 schematically illustrate two embodiments of an external optical device for longitudinal injection of energy DEOILE according to FIG. 1 or 2.

FIG. 3 represents a first embodiment of an external optical device for longitudinal injection of energy DEOILE, which comprises an energy source S, a spherical mirror MS translationally tied with the fixing assembly EF, and a convergent biconvex lens L disposed between the energy source S and the spherical mirror MS.

FIG. 4 represents a second embodiment of an external optical device for longitudinal injection of energy DEOILE, which comprises an energy source S, a spherical mirror MS translationally tied with the fixing assembly EF, a first lens L1 disposed between said energy source S and the spherical mirror MS, and a second lens L2 disposed between the spherical mirror MS and the corresponding partially reflecting mirror MPR. The first and second lenses L1 and L2 may be concave planar or convex planar, a planar surface being able to be employed as bearing surface when mounting the device so as to increase precision and reproducibility in the assembly and reduce the amplitude of the adjustment required subsequently in the positioning of the focusing point.

The portion of the fixing assembly EF serving as support for the spherical mirror MS is tilted by substantially 45° with respect to the incident energy beam and is tilted by substantially 45° with respect to the energy injection reflected beam, so as to reduce the inertia of the injection device with respect to the activation axis of the cavity by retaining dimensions allowing good focusing while compensating for the geometric aberrations introduced by the optical device. The radius of curvature of the spherical mirror MS lies between about 0.5 m and 4 m.

The fixing assembly EF comprises means for fixing the spherical mirror MS so as to maintain its position on the fixing assembly EF after adjustment of the energy injection. For example, these fixing means may be a rear support making it possible to modify an adjustment, or glue with which an adjustment becomes definitive.

The present invention makes it possible, at reduced cost, to produce a laser gyro with solid-state amplifying medium and optical ring cavity, which makes it possible to perform precise measurements even for low rates of rotation of the laser gyro.

The invention claimed is:

1. A laser gyro having a solid-state amplifying medium and an optical ring cavity, comprising:
   an assembly encompassing the optical cavity and able to experience an oscillating rotational motion;
   at least one external optical device for longitudinal injection of energy into the solid-state amplifying medium; and
   a fixing assembly adapted for translationally and rotationally binding said assembly encompassing the optical cavity and said external optical device for longitudinal injection of energy;
   wherein, the at least one external optical device for longitudinal injection of energy further comprises an energy source, a spherical mirror translationally tied with said fixing assembly, a first concave planar or convex planar lens disposed between said energy source and said spherical mirror, and a second concave planar or convex planar lens disposed between said spherical mirror and the corresponding partially reflecting mirror; the portion of the fixing assembly serving as support for said spherical mirror is tilted by substantially 45° with respect to the incident energy beam and is tilted by substantially 45° with respect to the energy injection reflected beam.

2. The laser gyro as claimed in claim 1, in which:
   said optical cavity further comprises several reflecting mirrors and at least one partially reflecting mirror; and
   said fixing assembly is designed in such a way that the part delivering energy of an external optical device for longitudinal injection of energy is situated at a minimum distance from the corresponding partially reflecting mirror depending on the optical and mechanical constraints of the laser gyro and that the external optical device for longitudinal injection of energy does not become maladjusted during said oscillating rotational motion.

3. The laser gyro as claimed in claim 1, in which the radius of curvature of said spherical mirror lies between about 0.5 m and 4 m.

4. The laser gyro as claimed in claim 1, in which the fixing assembly further comprises means for fixing the spherical mirror so as to maintain the position of said spherical mirror on the fixing assembly after adjustment of the energy injection.

5. The laser gyro as claimed in claim 4, in which said fixing means comprise a rear support or glue.

6. The laser gyro as claimed in claim 1, further comprising two external optical devices for longitudinal injection of energy disposed substantially symmetrically with respect to the solid-state amplifying medium.

7. The laser gyro as claimed in claim 1, further comprising two external optical devices for longitudinal injection of energy disposed substantially symmetrically with respect to the solid-state amplifying medium.

* * * * *